Dec. 23, 1958

A. RAMELLA 2,865,848

TEMPERATURE CONTROL IN HYDROCARBON
CONVERSION PROCESSES

Filed Sept. 24, 1952

INVENTOR
Amilcare Ramella
BY
Charles A. Huggett
ATTORNEY

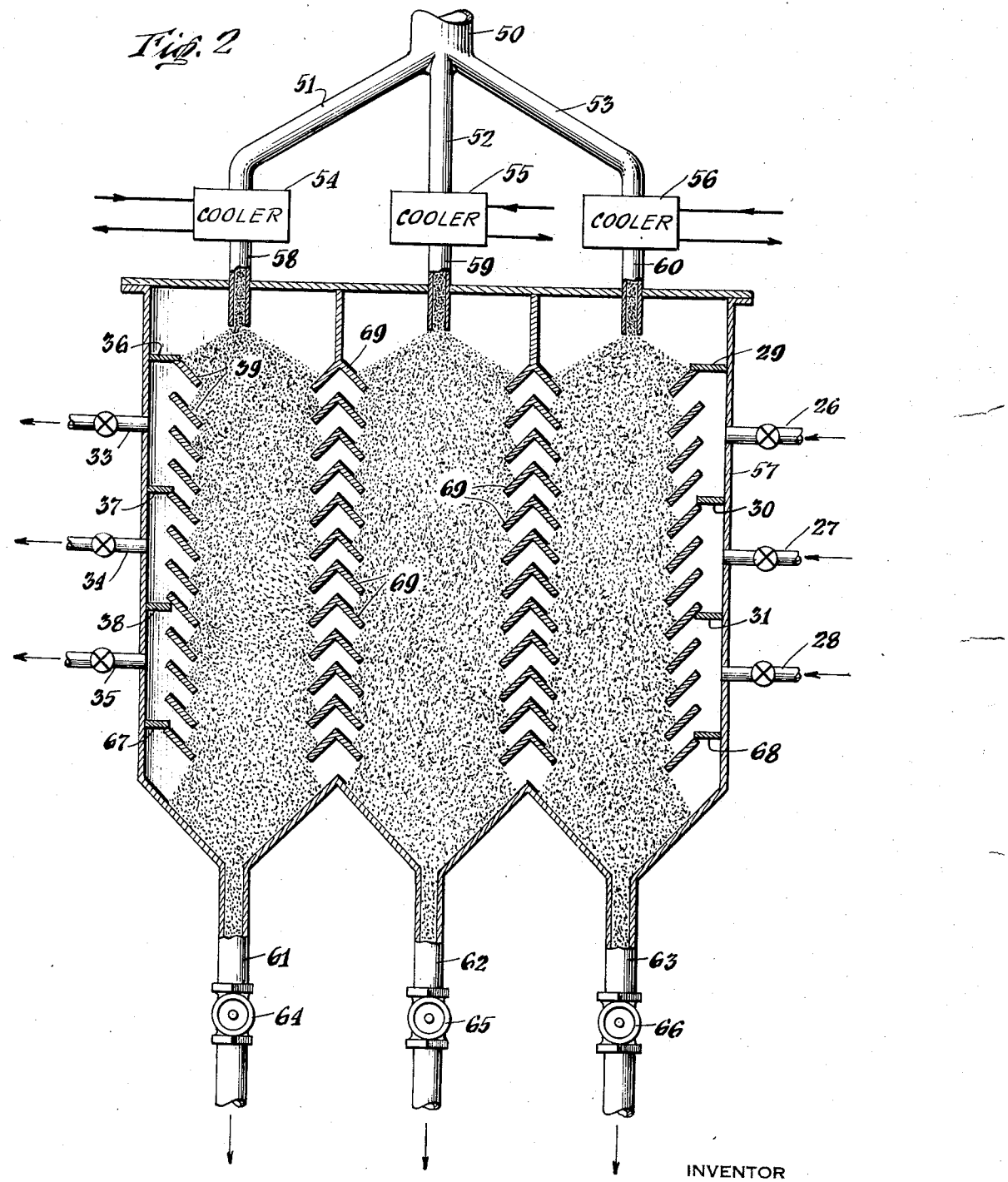

United States Patent Office 2,865,848
Patented Dec. 23, 1958

2,865,848

TEMPERATURE CONTROL IN HYDROCARBON CONVERSION PROCESSES

Amilcare Ramella, Woodbury, N. J., assignor to Socony Mobil Oil Company, Inc., a corporation of New York Application September 24, 1952, Serial No. 311,234

4 Claims. (Cl. 208—165)

This invention is directed to the continuous contacting of granular solid contact material with fluid hydrocarbons to effect transformation of the hydrocarbons. It is more particularly concerned with the continuous contacting of hydrocarbons with a substantially compact gravitating bed of solid contact material at conversion conditions in such a way that the temperature throughout the bed of contact material is maintained substantially uniform.

Many processes now use moving beds of granular contact material to provide heat for and/or provide catalytic action for the conversion or transformation of hydrocarbons. Such processes as dehydrogenation, desulfurization, reforming and cracking are typical. In cracking, heavy hydrocarbons are contacted with the granular material at elevated temperatures and pressures to cause the hydrocarbons to be transformed into lighter material, particularly to material boiling in the gasoline boiling range. The granular material is preferably gravitated in substantially compact columnar form through a reaction and reconditioning zone. Hydrocarbons are introduced into the bed in the reaction zone and passed through the void spaces in the bed. The converted products are removed from the other side thereof. During conversion, a carbonaceous deposit is formed on the surface of the material. This material is burned, at least in part, in the reconditioning zone by air blown through the void spaces in the bed. The process is made continuous by transferring solids from the bottom of one of these zones to the top of the other zone, completing an enclosed cyclic path.

It has been found that the type of reaction taking place in the reaction zone and the type of product produced depends upon several factors of operation, including reaction temperature. Cracking reactions may occur over a fairly wide range of temperature, say for example, 800–1050° F., but for a particular crude one temperature may be materially more desirable than another. Cracking is an endothermic reaction requiring the addition of heat to the reaction zone. In the past, the heat of reaction has been added either by means of heat supplied to the entering catalyst or heat supplied to the feed or a combination of both. It was found that where the reactants were admitted to the bed to countercurrent or concurrent with the catalyst, that a temperature gradient developed across the bed. The temperature at the top of the bed was often too high and that of the bottom of the bed too low.

The object of this invention is to provide an improved method of contacting a hydrocarbon feed with a gravitating granular contact material, in the form of a gravitating bed, in such a way that the temperature of the entire bed is substantially constant.

Another object of this invention is to contact a hydrocarbon feed with a gravitating bed of solid contact material in a moving bed conversion process in such a way that an increased yield of desired conversion products is obtained.

These and further objects of the invention will be disclosed in more detail in the following more extensive description of the invention and by reference to the drawings.

Figure 1 is a vertical elevation in section of a portion of a moving bed hydrocarbon conversion system showing an improved reactor for practicing this invention.

Figure 2 is a vertical elevation of another reactor, partially in section, showing apparatus for practising the invention.

This invention in one of its broad aspects comprises gravitating several streams of contact material in side-by-side relationship through a reactor in substantially compact form. The streams of contact material are in open communication along at least a substantial portion of the vertical length of the reaction zone, but so arranged that the flow rate of each stream may be independently controlled. A plurality of streams of hydrocarbons are introduced into one of the columns of contact material at spaced levels along the vertical length thereof, so as to pass horizontally through all of the columns of contact material and the streams are withdrawn at similarly-spaced levels along the vertical length of another column. The temperature and flow rate of each horizontally-flowing stream of hydrocarbons can be adjusted to provide a uniform temperature from the top of the bed of solids to the bottom. The flow rate and temperature of each gravitating stream of contact material can also be similarly adjusted to provide a uniform temperature from one side of the bed to the other side thereof, and therefore, all the contacting is effected at substantially the same temperature, that temperature found most suitable for the desired conversion.

Referring now to Figure 1, a vertical section of a reactor 10 is shown, with particle feeding and withdrawal apparatus. The rest of the moving bed system is not shown, being conventional. Solids are gravitated in substantially compact form from the hopper 11, through conduit 12, seal pot 13, conduits 14, 15, coolers 16, 17 and conduits 18, 19 into the reactor 10. The solid stream is split into two branches beneath the seal pot 13 and each branch has its separate cooler for temperature adjustment. A seal stream is introduced via the conduit 20 into the seal pot 13 to provide a seal for the column and prevent reactants from escaping from the reactor 10. A cooling fluid is introduced into the cooler 16 via the conduit 21 and withdrawn therefrom via the conduit 22. A coolant fluid is introduced into the cooler 17 via the conduit 23 and withdrawn via the conduit 24. The temperature of the two columns of catalyst supplied to the reactor can, therefore, be separately adjusted.

The solids are discharged from the conduits 18, 19 into the reactor to form a substantially compact bed of solids. A vertical partition 25 separates the upper portion of the vessel between the columns and projects at its lower end downwardly into the bed of solids. But below the partition the columns of catalyst meet along a common plane surface. A plurality of pipes 26, 27 and 28 are attached to the vessel 10 along one side thereof. Horizontal shelves 29, 30 and 31 are located along the inner wall of the vessel 10, above and in between the conduits 26, 27 and 28. Each pair of shelves provides a gas plenum chamber. A plurality of louvers 32 is arranged in vertical series at the edge of the shelves. The louvers 32 may be flat baffles disposed at a steep angle, so that the hydrocarbon vapors can pass therebetween but solids will not pass. This keeps the solids from entering the plenum chambers. Hydrocarbon withdrawal conduits 33, 34 and 35 are similarly arranged along the other side of the vessel 10. Shelves 36, 37 and 38 are also arranged along that side of the vessel to provide gas plenum chambers and louvers 39 are used to prevent the solids from entering the plenum chambers. A horizontal partition 40 is located horizontally across the lower portion of the vessel 10 and pipes 41 depend from the partition to transfer the solids from the reaction zone. A seal gas is introduced into the bed beneath the partition 40 via the pipe 42 to both seal the exit columns and strip the solids of vaporizable hydrocarbons. The two streams of contact material are withdrawn separately via the pipes 43, 44 at flow rates controlled by the setting of the valves 45, 46.

In operation, the flow rate and temperature of the streams of hydrocarbons are controlled so that any tendency of the temperature of the particles to drop during transfer downwardly through the vessel is offset by heat supplied by the hydrocarbons. The flow rate of the two streams of solids and the temperature of each stream is adjusted so that any tendency for the temperature of the hydrocarbons to fall during transfer across the vessel is offset by heat supplied by the catalyst. By suitable control of these factors, the temperature of the entire reaction bed, both from top to bottom and side to side is maintained substantially constant.

A more preferred embodiment of the invention is illustrated by means of Figure 2. The conduit 50 carrying a substantially compact stream of solids is split into three paths, by the conduits 51, 52 and 53. The hot catalyst may be cooled by coolers 54, 55 and 56. The separate streams of solids are introduced into the reactor 57 via the conduits 58, 59 and 60 to form three gravitating columns of catalyst in side-by-side relationship. Each column is withdrawn separately from the bottom of the vessel via the conduits 61, 62 and 63 at flow rates controlled by the valves 64, 65 and 66. The hydrocarbon introduction and withdrawal system is the same as that shown on Figure 1, and therefore, similar numbers have been used for similar parts. Shelves 67, 68 are used at the bottom in place of partition 40. In the space between the columns of catalyst louvers 69 are used to prevent the catalyst from mixing. These louvers may be in the form of stacked troughs having the peak at the top and sides sloping downwardly. The troughs are placed close enough together to prevent the solids from one column from mixing with the other, but far enough apart to permit the hydrocarbon vapors to flow between adjacent louvers freely. Seal gas is introduced into the gravitating catalyst column above and below the reaction zone to prevent the reactants from travelling through the column. This method of confining the reactants to the reaction zone is conventional and, therefore, not disclosed in further detail.

The streams of solids are recombined below the reactor and transferred to the kiln, not shown, for regeneration. Air is blown through the bed of solids in the kiln and the carbonaceous material is burned. The temperature of the solids is adjusted by means of cooling coils in the kiln subsequent thereto, and the hot solids are returned to the top of the reactor for reuse in the process.

It is understood that the specific examples of apparatus, design and arrangement, and of operation and application of this invention are intended only as illustrative of the invention and it is intended to cover all changes and modifications thereof which do not constitute departure from the spirit and scope of the invention.

I claim:

1. The method of converting hydrocarbons in the presence of a moving bed of granular contact material which comprises: gravitating a plurality of streams of granular contact material downwardly through a reaction zone in contiguous relationship along the vertical length of each stream, introducing a plurality of streams of hydrocarbons into one of the streams of contact material at spaced levels along the length thereof, withdrawing the streams of hydrocarbons at similarly spaced levels along the length of one of the other streams of contact material, so that the hydrocarbons pass laterally through all the contiguous streams of contact material, controlling the flow rate and temperature of each stream of hydrocarbons, so that the temperature of the reaction zone is maintained substantially constant from top to bottom, and controlling the flow rate and temperature of the contiguous streams of contact material, whereby the temperature of the reaction zone from one side to the other is maintained substantially constant.

2. The method of converting hydrocarbons in the presence of a moving bed of granular contact material which comprises: gravitating two streams of granular contact material downwardly through a reaction zone in contiguous relationship, the columns being in substantially open communication along a vertical plane surface from substantially the top of the zone to substantially the bottom of the zone, introducing a plurality of streams of hydrocarbons into one of the columns at spaced levels along the vertical length thereof, withdrawing the streams of hydrocarbons at similarly spaced levels along the length of the other column, so that the hydrocarbons are passed laterally through substantially the entire thickness of both columns, controlling the flow rate and temperature of each stream of hydrocarbons, so as to maintain the temperature of the columns of contact material substantially constant from top to bottom and controlling the flow rate and temperature of the catalyst streams, so that the temperature across the reaction zone is maintained substantially constant.

3. The method of converting hydrocarbons in the presence of a moving bed of granular contact material which comprises: gravitating three substantially compact columns of contact material downwardly through a reaction zone in contiguous relationship, the columns being in substantially open communication along vertical plane surfaces from substantially the top of the zone to substantially the bottom of the zone, the columns being so baffled that there is substantially no commingling of particles of one column with those of the adjacent column, introducing a plurality of streams of hydrocarbons into one of the columns at spaced levels along the vertical length thereof, withdrawing the streams of hydrocarbons at similarly spaced levels along the length of another of the columns, so that the streams of hydrocarbons flow in a substantially horizontal direction through the entire gravitating mass, from one side of the reaction zone to the other side thereof, controlling the flow rate and temperature of each stream of hydrocarbons, in such a way that the temperature of the columns is maintained in the vertical direction substantially constant and controlling the temperature and flow rate of the three streams of contact material, in such a way that the temperature of the columns is maintained in the horizontal direction substantially constant, whereby the temperature is maintained substantially uniform throughout the entire reaction zone.

4. The method of converting hydrocarbons in the presence of a moving bed of granular contact material which comprises: gravitating a plurality of streams of granular contact material downwardly through a reaction zone in open communication, one with the other, introducing hydrocarbons into one of the streams along the vertical length thereof, withdrawing hydrocarbons from one of the other streams at the same vertical elevation, so that the hydrocarbons pass laterally through all the streams of contact material, and controlling the flow rate and temperature of the streams of contact material, so that the temperature of the reaction zone is maintained substantially constant from one side to the other.

References Cited in the file of this patent

UNITED STATES PATENTS

| | | |
|---|---|---|
| 2,344,449 | Ogorzaly | Mar. 14, 1944 |
| 2,376,365 | Lassiat | May 22, 1945 |
| 2,390,031 | Schutte | Nov. 27, 1945 |
| 2,493,218 | Bergstrom | Jan. 3, 1950 |
| 2,534,859 | Evans | Dec. 10, 1950 |
| 2,554,407 | Hepp | May 22, 1951 |
| 2,606,861 | Eastwood | Aug. 12, 1952 |
| 2,673,786 | Alleman | Mar. 30, 1954 |
| 2,692,903 | Hachmuth | Oct. 26, 1954 |